(12) United States Patent
Nannini

(10) Patent No.: US 6,239,362 B1
(45) Date of Patent: May 29, 2001

(54) DEVICE FOR COMPENSATING VARIATIONS IN THE LENGTH OF TENSIONED CABLES, WITH SUBSTANTIALLY CONSTANT TRACTION

(75) Inventor: Osvaldo Nannini, Milan (IT)

(73) Assignee: Pfisterer S.r.l., Corsico (IT)

( * ) Notice: Subject to any disclaimer, the term of this patent is extended or adjusted under 35 U.S.C. 154(b) by 0 days.

(21) Appl. No.: 09/297,145

(22) PCT Filed: Oct. 31, 1997

(86) PCT No.: PCT/EP97/06023

§ 371 Date: Apr. 26, 1999

§ 102(e) Date: Apr. 26, 1999

(87) PCT Pub. No.: WO98/21794

PCT Pub. Date: May 22, 1998

(30) Foreign Application Priority Data

Nov. 8, 1996 (IT) .............................................. MI96A2324

(51) Int. Cl.⁷ ......................... H02G 7/00; C07D 315/00
(52) U.S. Cl. ................................. 174/40 TD; 174/45 TD; 174/69; 174/43; 242/416; 242/419.8; 242/420
(58) Field of Search ............................. 174/40 R, 40 TD, 174/45 TD, 45 R, 43, 69; 242/416, 419.8, 420

(56) References Cited

U.S. PATENT DOCUMENTS

| 1,205,281 | * | 11/1916 | Sorenson | 242/155 R |
| 2,121,478 | * | 6/1938 | Dorman | 173/251 |
| 3,044,763 | * | 7/1962 | Jorzenink | 267/69 |

FOREIGN PATENT DOCUMENTS

| 918992 | 10/1954 | (DE) . |
| 2456635 | 12/1980 | (FR) . |

* cited by examiner

*Primary Examiner*—Dean A. Reichard
*Assistant Examiner*—Charlie Nguyen
(74) *Attorney, Agent, or Firm*—Guido Modiano; Albert Josif; Daniel O'Burne

(57) ABSTRACT

A device for compensating length variations of tensioned cables, with a substantially constant tension, including a contrast element, which is meant to be interposed between one end of the tensioned cable and an anchoring element and is adapted to generate an elastic reaction which can vary as a function of the length variation of the cable. The device includes elements for connecting the contrast element to the cable which are suitable to convert the elastic reaction of the contrast element into a substantially constant tension applied to the cable, regardless of its length, over a preset length variation range.

18 Claims, 4 Drawing Sheets

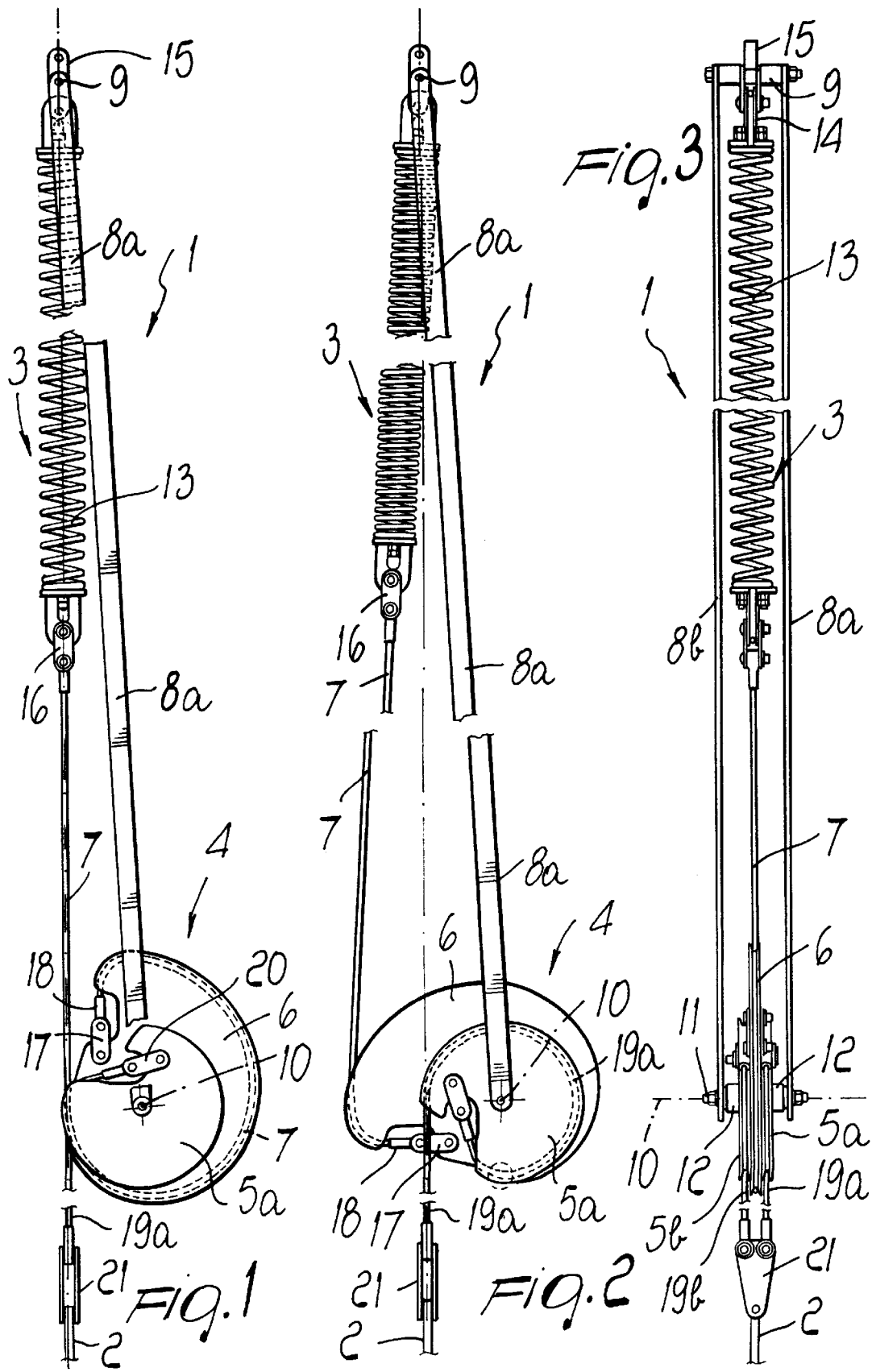

DEVICE FOR COMPENSATING VARIATIONS IN THE LENGTH OF TENSIONED CABLES, WITH SUBSTANTIALLY CONSTANT TRACTION

BACKGROUND OF THE INVENTION

The present invention relates to a device for compensating length variations in tensioned cables, with substantially constant traction.

The conductors of overhead power lines for distributing and carrying power or for railroad traction are installed with a very specific tension value which takes into account the ultimate tensile strength of the cables, the strength of the supporting structures and the requirements in terms of maximum sag at the center of the span.

The configuration assumed by the cable after tensioning is not constant and invariable over time but is closely dependent on the ambient temperature, since the material of which the cable is made, which can be copper or alloys thereof, aluminum or alloys thereof, steel or aluminum with a steel core, expands or contracts as the temperature increases or decreases.

This fact causes the sag in the middle of the span to increase or decrease. This variation in the sag of the span, traced by the cable owing to its own weight, cannot be tolerated in some applications owing to electrical and/or mechanical reasons.

The electrical reasons consist of the fact that as the sag increases, the insulation distances towards the surrounding parts, such as for example the ground, decrease. Moreover, the decrease in tensioning force caused by an elongation of the cable makes said cable more subject to oscillations and swaying caused by the wind, which can make the cable move dangerously close to other cables of different phases or to grounded parts.

The mechanical reasons can be seen typically in the catenary curve of electric contact lines of railroads. Conventionally these lines are constituted by a supporting cable from which the contact wire is suspended; the pantograph of locomotives makes sliding contact with the underside of said wire to tap the current. The contact wire is supported by the supporting cable by means of so-called "droppers" placed at short preset distances, so that while the profile of the supporting cable has the typical sag, the profile of the contact wire remains significantly straight, so as to be practically horizontal, in order to allow correct sliding of the pantograph. A contraction of the supporting cable and/or of the contact wire, caused by thermal variations, can cause unacceptable stresses on said cables or on the supports and can cause an abnormal lifting of the contact wire with respect to the rail level; such stresses and lifting might not be compatible with correct collection of the current by the pantograph, in addition to causing abnormal wear of the contact wire. Likewise, an elongation of the supporting cable and/or of the contact wire, caused by thermal variations, can cause abnormal lowerings of the contact wire, equally causing problems in the correct collection of the current.

Different systems are used to compensate variations in the length of the cables as a consequence of temperature variations.

A first system is constituted by counterweighting and consists substantially in connecting one end of the cable, by means of pulleys, to a weight which corresponds to the tensioning force of the cable or is reduced as a function of the ratio of the pulley system. In this way, the tension of the cable remains unchanged as the length of the cable varies, since the installed weight is invariant. This system, which is still the most widely used system today, has the drawback that it requires a large space occupation, which is not always compatible with the installation requirements, especially in the railroad field, such as for example in tunnels, where very often it is physically impossible to provide recesses into which the counterweights might slide, or in which it might be possible to provide recesses but at excessively high costs. Another drawback of this system is the high installation cost, caused mainly by the need to resort to auxiliary structures for supporting, guiding and protecting the counterweights.

Another system is based on the use of a gas-filled compensator. In this system, one end of the cable is connected to a device which comprises a spring/damper unit containing compressed gas, usually nitrogen; said unit provides a significantly constant load. This system has the advantage, with respect to counterweighting, of requiring a modest space occupation for its installation, but it is not free from drawbacks, since problems are observed a few years after the first installations, mainly in relation to the loss of gas from the unit, requiring continuous monitoring and maintenance. The cost of this device is also high and restricts its use to particular cases.

Compensators are also known which are actuated by an electric motor and are substantially constituted by a device having a sensor for detecting variations in the length of the cable caused by thermal variations, which drives an electric motor which in turn actuates a rod connected to the cable to be compensated. This system, too, is not free from drawbacks, since it has a high cost, also caused by the need to install an electrical power supply and control panel and by the need to have a low-voltage electric power source, which is not always available or at least not available cheaply. Such a technical solution is disclosed in FR-A-2,456,635.

Another compensation system is constituted by the simple spring compensator. This system substantially uses a helical spring which "damps" the mechanical effects caused by the expansion or contraction of the cable but is unable to keep the tension of the cable constant due to the characteristic of the spring of varying the load in proportion to the stroke.

SUMMARY OF THE INVENTION

The aim of the present invention is to solve the above-mentioned problems, providing a device for compensating the length variations of tensioned cables, which is capable of ensuring, with a purely mechanical and highly reliable operation, that a constant tension is maintained on the cable regardless of its length variations.

Within the scope of this aim, an object of the present invention is to provide a device which requires a very small volume for its installation.

Another object of the invention is to provide a device which is simple and quick to install and does not require frequent maintenance.

Another object of the present invention is to provide a device which can be manufactured at a cost which is competitive with respect to conventional compensators.

This aim, these objects and others which will become apparent hereinafter are achieved by a device for compensating length variations of tensioned cables, with a substantially constant tension, comprising a contrast element which is meant to be interposed between one end of the tensioned cable and an anchoring element and is adapted to generate an elastic reaction which can vary as a function of the length variation of the tensioned cable, characterized in that it comprises means for connecting said contrast element to said tensioned cable, said connecting means being suitable to convert the elastic reaction of said contrast element into a substantially constant tension applied to said tensioned cable, regardless of its length, over a preset length variation range.

BRIEF DESCRIPTION OF THE DRAWINGS

Further characteristics and advantages of the present invention will become apparent from the following detailed description of two preferred but not exclusive embodiments of the device according to the present invention, illustrated only by way of non-limitative example in the accompanying drawings, wherein:

FIGS. 1 to 7 are views of the device according to a first embodiment, and more specifically:

FIG. 1 is a schematic lateral elevation view of the device according to the present invention in the operating condition that corresponds to the maximum contraction of the tensioned cable;

FIG. 2 is a view, similar to FIG. 1, of the device according to the present invention in the operating condition that corresponds to the maximum elongation of the tensioned cable;

FIG. 3 is a front elevation view of the device according to the present invention in the operating condition that corresponds to FIG. 1;

FIGS. 4 to 6 are schematic views of the operating principle of the device according to the present invention in three different length conditions of the tensioned cable;

FIG. 7 plots the reaction force of the contrast element as the length of the tensioned cable varies, with reference to the first embodiment of the device shown in the preceding figures;

FIG. 8 is a schematic lateral elevation view of the device according to the present invention in the operating condition that corresponds to the maximum contraction of the tensioned cable;

FIG. 9 is a view, similar to FIG. 8, of the device according to the present invention in the operating condition that corresponds to the maximum elongation of the tensioned cable;

FIG. 10 is a front elevation view of the device according to the present invention in the operating condition that corresponds to FIG. 8;

FIGS. 11 and 12 are schematic views of the operating principle of the device according to the present invention in the two different length conditions of the tensioned cable that correspond to FIGS. 8 and 9.

DESCRIPTION OF THE PREFERRED EMBODIMENTS

Figures 4, 5, 6:
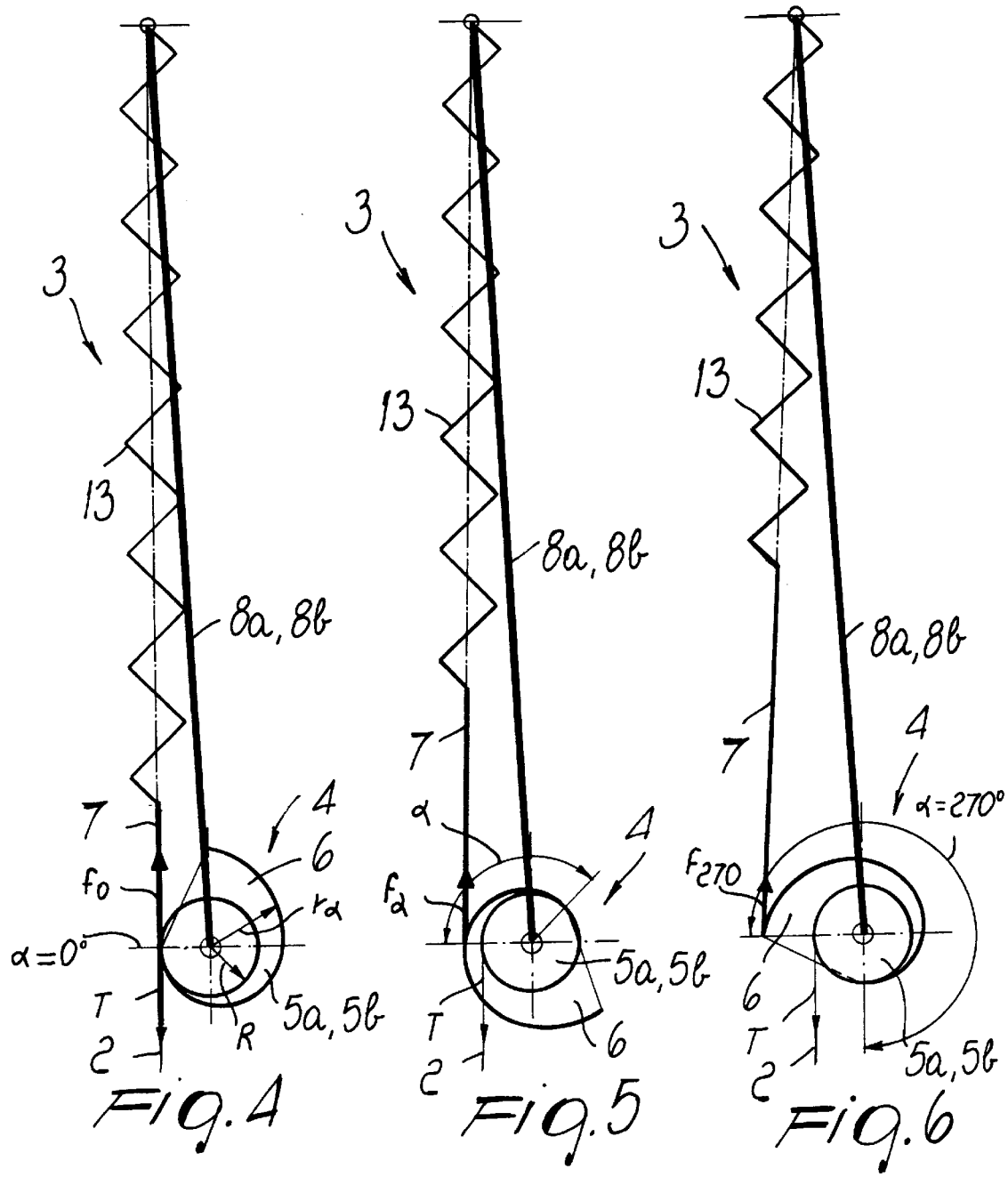
Figure 7:
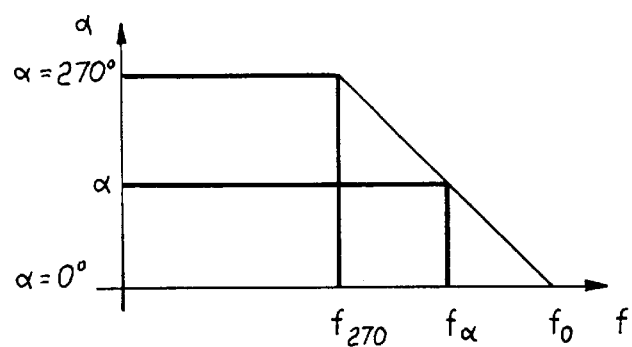

With reference to FIGS. 1 to 7, in which the device has been shown vertically for the sake of convenience although it is meant to be installed horizontally, the device according to the present invention, generally designated by the reference numeral 1, comprises a contrast element 3, which is meant to be interposed between an end of the tensioned cable 2 and an anchoring element, which can be constituted by an anchoring pole or other fixed installation. The contrast element 3 is adapted to generate an elastic reaction f which is variable as a function of the length variation of the cable 2. The device also comprises means 4 for connecting the contrast element 3 to the cable 2; said connecting means 4 are adapted to convert the elastic reaction f of the contrast element 3 into a substantially constant tension applied to the cable 2, regardless of its length, over a preset length variation range.

The connecting means 4 comprise a lever system and are preferably constituted by at least one constant-radius pulley 5a, 5b, supported so that it can rotate about its own axis, and a variable-radius pulley 6, which is rigidly coupled to the constant-radius pulley 5a, 5b. The cable 2 is connected to the constant-radius pulley 5a, 5b and can be wound thereon, while the contrast element 3 is connected to the variable-radius pulley 6 by means of a connecting cable 7, which can be wound on the variable-radius pulley 6 with an opposite winding direction with respect to the winding direction of the cable 2 on the constant-radius pulley 5a, 5b.

More particularly, the assembly constituted by the constant-radius pulley or pulleys 5a, 5b and by the variable-radius pulley 6 is supported by means of a pair of arms 8a, 8b which are joined, at one of their ends which is meant to be associated with the anchoring element, by a transverse pivot 9. The arms 8a and 8b support the pulleys 5a, 5b and 6 so that they can rotate about an axis 10 coinciding with the axis of the constant-radius pulley or pulleys 5a, 5b; said pulleys 5a, 5b and 6 rotate rigidly together about said axis 10.

The pulleys 5a, 5b and 6 can be supported by means of a pivot 11 which forms the axis 10 by means of its own axis and supports the pulleys by means of bearings 12.

The contrast element 3 is preferably constituted by a helical spring 13, a longitudinal end of which is connected, by means of a suitable end portion 14, to the pivot 9, which is fixed to the arms 8a and 8b and is used to connect said arms, by means of a linkage 15, to the anchoring element. The other longitudinal end of the spring 13 is fixed, by means of a suitable end portion 16, to the connecting cable 7, which winds around the variable-radius pulley 6 and is fixed thereto by means of two linkages 17 which have a compression-type end portion 18.

In the illustrated embodiment, instead of a single constant-radius pulley there are provided two twin constant-radius pulleys, designated by the reference numerals 5a and 5b, which are mutually coaxial and have the same radius; each constant-radius pulley forms a winding race for cables 19a, 19b, which are connected to the respective constant-radius pulley 5a or 5b by means of linkages 20 and are joined, at the opposite end, by a yoke 21 which connects them to the tensioned cable 2.

The variable-radius pulley 6 is interposed between the two constant-radius pulleys 5a and 5b so as to achieve excellent balancing of the flexural moments on the pivot 11, generated by the tension of the cable 2 and by the elastic reaction of the spring 13.

In practice, the tension T applied to the cable 2 splits, on the two constant-radius pulleys 5a and 5b, into two identical forces equal to half of the tension T, but for the sake of convenience in exposition, reference will be made hereinafter to the tension T applied to the cable 2 as if the two cables 19a and 19b were a single cable and a single constant-radius pulley, corresponding to the pulley 5a or 5b, were used.

The profile of the variable-radius pulley 6 is studied so as to ensure a constant tension T in the various operating conditions of the device although the reaction of the spring 13 is variable as a function of the length variation of the cable 2.

In practice, the behavior of the radius $r_\alpha$ of the variable-radius pulley is chosen so as to meet the relation $R.T = r_\alpha.f_\alpha$, which expresses the state of equilibrium, about the axis 11, of the two torques that act on the pulleys and are generated by the tension T and by the reaction $f_\alpha$ of the spring 13.

This relation leads to the following one:

$$r_\alpha = \frac{R \cdot T}{f_\alpha}$$

where:

$\alpha$ is the rotation angle of the pulleys, R and T are respectively the radius of the constant-radius pulley and the tension applied to the cable 2 to be kept constant, $f_\alpha$ is the force applied by the spring 13 as a consequence of a rotation $\alpha$ of the pulleys and can be easily calculated, since the spring 13 has a linear elastic characteristic.

In a preferred embodiment, if a total rotation of the pulleys 5a, 5b and 6 through 270° is used in order to compensate for a total elongation L of the cable 2, $$2\pi R = L \frac{360}{270}$$

is obtained from which $$R = \frac{L \cdot 2}{3\pi}$$

If a pre-tension $f_{270}$, which corresponds to $\alpha=270°$, i.e., to half the maximum force $f_0$, which corresponds to $\alpha=0°$, i.e., to the maximum contraction condition of the cable 2 (FIG. 4), is applied to the spring 13, the reaction force of the spring 13 that corresponds to a rotation angle $\alpha$ of the pulleys is:

$$f_\alpha = f_0 - \frac{\alpha}{270}(f_0 - f_{270})$$

from which:

$$f_\alpha = f_0\left(1 - 0.5\frac{\alpha}{270}\right)$$

These relations allow to obtain the polar equation of the curve related to the profile of the variable-radius pulley 6 actuated by the spring 13:

$$r_\alpha = \frac{R \cdot T}{f_\alpha} = \frac{R \cdot T}{f_0\left(1 - 0.5\frac{\alpha}{270}\right)}.$$

Since $f_0$ is equal to T, because $r_\alpha = R$ when $\alpha = 0$, $$r_\alpha = \frac{R}{\left(1 - 0.5 \cdot \frac{\alpha}{270}\right)}$$

is obtained.

The dimensions and the polar equation of the profile of the variable-radius pulley 6 have been given merely by way of non-limitative example under the assumption of compensating a total elongation L of the tensioned cable by means of a 270° rotation of the pulleys 5a or 5b, 6, if the preloading force $f_{270}$ of the spring 13, which corresponds to $\alpha=270°$, is equal to half of the maximum force $f_0$ generated by the spring 13 and corresponds to $\alpha=0°$ and with the geometrical configuration shown schematically in the figures.

Therefore, if other hypotheses are considered due to operating requirements, such as for example the possibility to compensate for a variation in the length of the cable with a different rotation angle of the pulleys, the profile of the variable-radius pulley 6 can be different.

Figure 9:
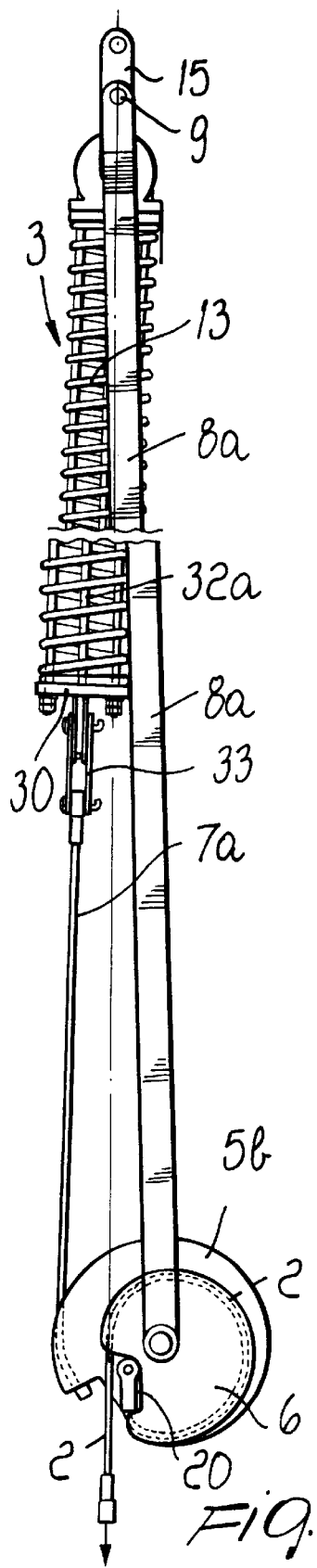
FIGS. 8 to 12 are views of the device according to a second embodiment, and more particularly.
Figure 8:
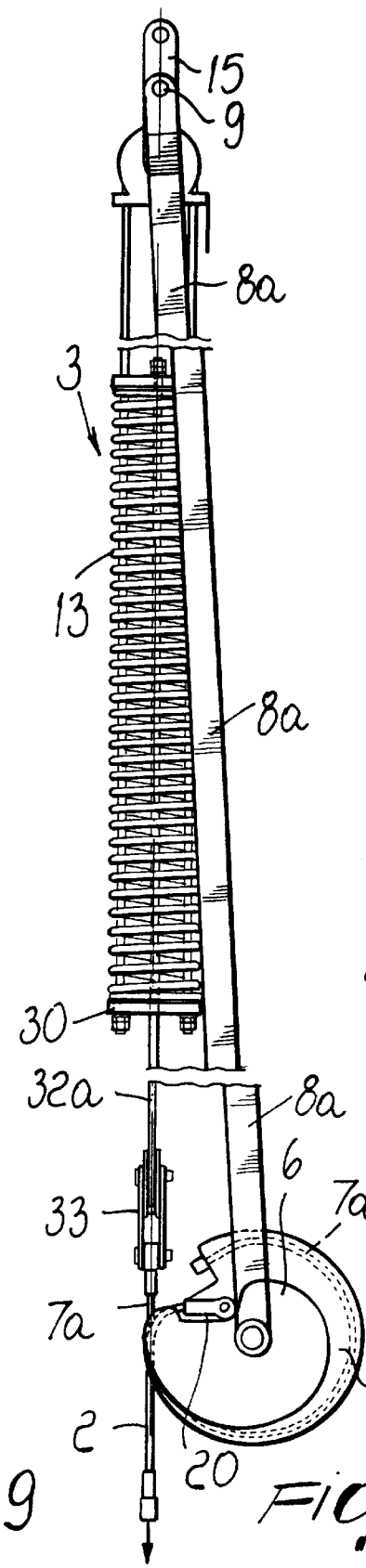
Figure 10:
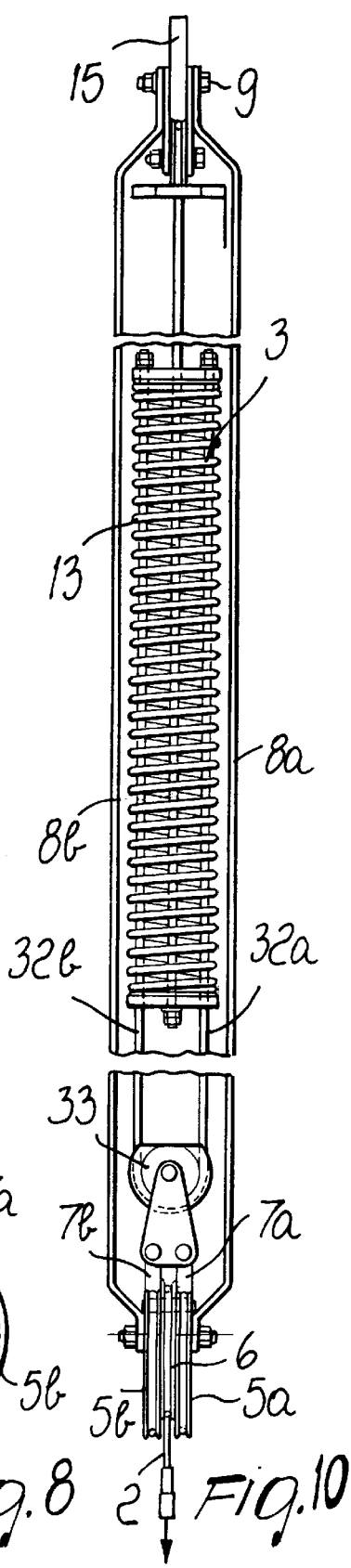
Figure 11:
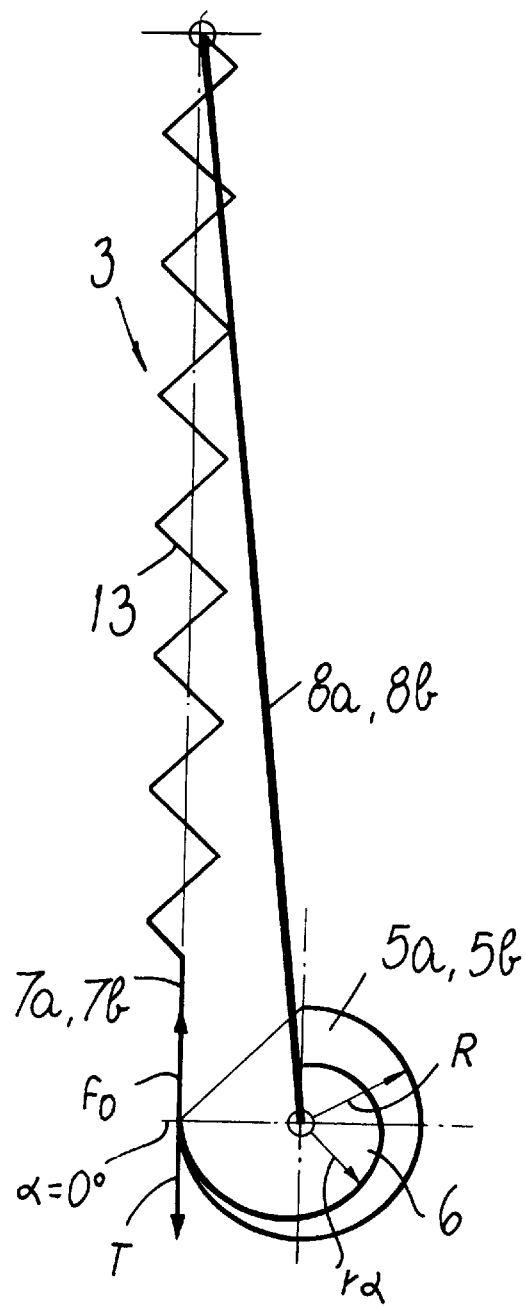
Figure 12:
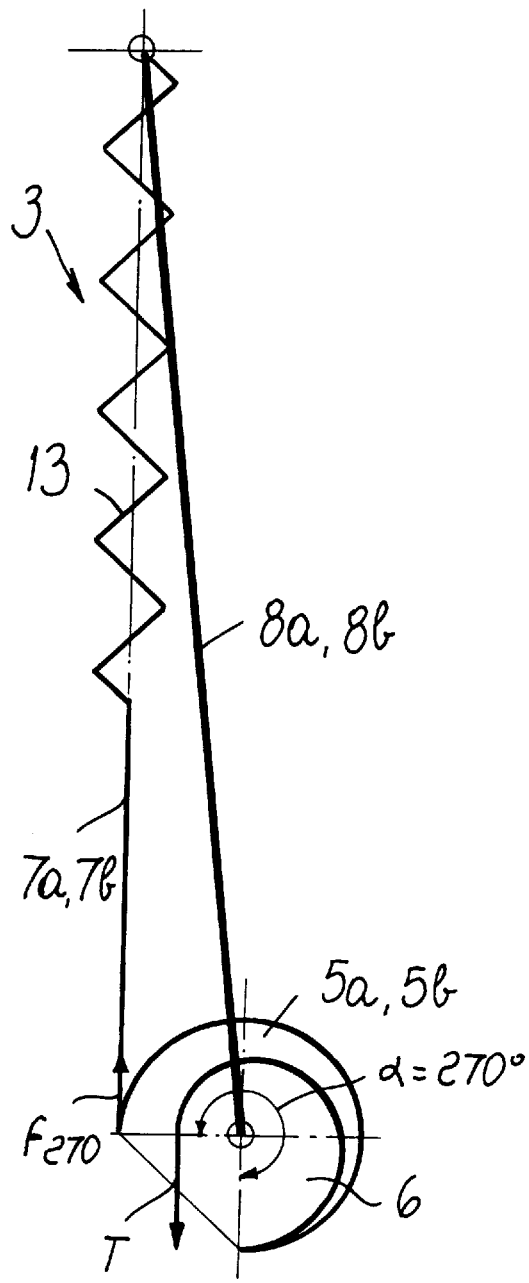

FIGS. 8 to 12 illustrate a second embodiment of the device according to the present invention, wherein the device is again shown vertically for the sake of convenience, although it is meant to be installed horizontally. This embodiment uses, as a contrast element 3, a spring 13 which acts by compression instead of traction and is connected, so as to allow winding, on at least one constant-radius pulley 5a, 5b, while the tensioned cable 2 is connected to a variable-radius pulley 6. As regards the other reference numerals of FIGS. 8 to 12, the same reference numerals as in the preceding figures have been maintained.

More particularly, the spring 13, in this second embodiment, is interposed between a fixed plate 30, connected to the pivot 9, and a moving plate 31, which is connected to two traction elements 32a and 32b which connect it, by means of a pulley 33, to two connecting cables 7a and 7b which replace the connecting cable 7. The two connecting cables 7a and 7b are fixed and can wind on two fixed-radius pulleys 5a and 5b, with a winding direction which is the opposite of the winding direction of the tensioned cable 2 on the variable-radius pulley 6.

The variable-radius pulley 6 is arranged between the two constant-radius pulleys 5a and 5b in order to balance the moments caused by the tension of the cable 2 and by the elastic reaction force of the spring, which is transmitted along the two connecting cables 7a and 7b.

In this case, the equilibrium condition of the two torques that act on the pulleys and are generated by the tension T and by the reaction $f_\alpha$ of the spring 13 is expressed by the relation $R.f_\alpha = r_\alpha.T$, from which:

$$r_\alpha = \frac{R \cdot f_\alpha}{T}$$

where
R=radius of the constant-radius pulley 5a, 5b;
$r_\alpha$=radius of the variable-radius pulley 6.
For $f_0=T$ and $f_{270}=0.5.f_0=0.5.T$ $$f_\alpha = f_0\left(1 - 0.5\frac{\alpha}{270}\right)$$

is obtained from which:

$$r_\alpha = R \cdot \left(1 - 0.5 \cdot \frac{\alpha}{270}\right).$$

The operation of the device according to the present invention is evident from what has been described and illustrated.

In particular, it is clear that in the presence of a contraction of the cable 2, the elastic reaction of the spring 13 increases and that in the presence of an elongation of the cable 2 the elastic reaction of the spring 13 decreases. Notwithstanding the variability of the elastic reaction of the spring 13, by means of the particular connection provided between the cable 2 and the spring 13 the tension T applied to the cable remains constant as the length of said cable 2 varies.

In practice, it has been observed that the compensating device according to the present invention fully achieves the intended aim, since despite using a contrast element of the elastic type, i.e., with an elastic reaction which is variable as a function of the length variations of the tensioned cable, is capable of ensuring in any case a constant tension applied to the cable in the different operating conditions.

The device thus conceived is susceptible of numerous modifications and variations, all of which are within the scope of the inventive concept; all the details may also be replaced with other technically equivalent elements.

In practice, the materials employed, as well as the dimensions, may be any according to requirements and to the state of the art.

What is claimed is:

1. A device for compensating length variations of tensioned cables, with a substantially constant tension, comprising a contrast element which is meant to be interposed between one end of a tensioned cable and an anchoring element and is adapted to generate an elastic reaction which can vary as a function of the length variation of the tensioned cable, further comprising means for connecting said contrast element to said tensioned cable, said connecting means comprising a lever system and being adapted to convert the elastic reaction of said contrast element into a substantially constant tension applied to said tensioned cable, regardless of its length, over a preset length variation range.

2. The device according to claim 1, wherein said connecting means comprise at least one constant-radius pulley, which is supported so that it can rotate about its own axis, and a variable-radius pulley, which is rigidly coupled to said constant-radius pulley, said tensioned cable being connected to said constant-radius pulley and being windable thereon, said contrast element being connected to said variable-radius pulley by means of a connecting cable which can be wound on said variable-radius pulley with a winding direction which is opposite to the winding direction of said tensioned cable on said constant-radius pulley.

3. The device according to claim 2, wherein said contrast element is constituted by a spring which elastically contrasts the rotation of said pulleys in the unwinding direction of said tensioned cable.

4. A device according to claim 3, wherein said spring is constituted by a helical spring.

5. A device according to claim 2, wherein the radius of said variable-radius pulley is expressed by the equation $$r_\alpha = \frac{R \cdot T}{f_\alpha}$$

where
R=radius of the constant-radius pulley
T=tension of the tensioned cable
$f_\alpha$=elastic reaction force of the contrast element as a function of the rotation angle α of the pulleys as a consequence of the variation in the length of the tensioned cable $r_\alpha$=radius of the variable-radius pulley as a function of the rotation angle α of the pulleys as a consequence of the variation in the length of the tensioned cable.

6. The device according to claim 2, characterized in that the winding angle of said cables on the corresponding pulleys is substantially 270°.

7. The device according to claim 6, wherein said contrast element is preloaded, when α=270°, which corresponds to the maximum elongation of the tensioned cable, with a force $f_{270}$ which is substantially equal to half the maximum reaction force $f_0$ (when α=0°, which corresponds to the maximum contraction of the tensioned cable).

8. The device according to claim 2, wherein the radius of said pulley whose radius can vary as a function of the rotation angle α of the pulleys in order to compensate a variation in the length of the tensioned cable is expressed by the equation:

$$r_\alpha = \frac{R}{\left(1 - 0.5 \cdot \frac{\alpha}{270}\right)}$$

where R is the radius of the constant-radius pulley; the angle for winding the tensioned cable on the constant-radius pulley is substantially equal to 270°; the angle for winding the connecting cable on the variable-radius pulley is substantially equal to 270°; the preloading force $f_{270}$ of the contrast element, which corresponds to α=270°, is substantially equal to half the maximum reaction force $f_0$, which corresponds to α=0°.

9. The device according to claim 2, comprising said at least one constant-radius pulley being two coaxial constant-radius pulleys between which said variable-radius pulley is interposed, said tensioned cable being divided, at its end which is connected to said connecting means, into two cables which can be wound on said two constant-radius pulleys.

10. The device according to claim 1, wherein said connecting means comprise at least one constant-radius pulley, which is supported so that it can rotate about its own axis, and a variable-radius pulley, which is rigidly coupled to said constant-radius pulley, said tensioned cable being connected to said variable-radius pulley and being windable thereon and said contrast element being connected to said constant-radius pulley by means of a connecting cable which can be wound on said constant-radius pulley with a winding direction which is the opposite of the winding direction of said tensioned cable on said variable-radius pulley.

11. The device according to claim 10, wherein the radius of said variable-radius pulley is expressed by the equation $$r_\alpha = \frac{R \cdot f_\alpha}{T}$$

where
R=radius of the constant-radius pulley
T=tension of the tensioned cable
$f_\alpha$=elastic reaction force of the contrast element as a function of the rotation angle α of the pulleys as a consequence of the length variation of the tensioned cable
$r_\alpha$=radius of the variable-radius pulley as a function of the rotation angle α of the pulleys as a consequence of the length variation of the tensioned cable.

12. The device according to claim 10, wherein the winding angle of said cables on the corresponding pulleys is substantially 270°.

13. A device according to claim 12, wherein said contrast element is preloaded (when α=270°, which corresponds to the maximum expansion of the tensioned cable) with a force $f_{270}$ which is substantially equal to half the maximum reaction force $f_0$ (when α=0°, which corresponds to the maximum contraction of the tensioned cable).

14. The device according to claim 10, wherein the radius of said pulley whose radius can vary as a function of the rotation angle α of the pulleys in order to compensate a length variation of the tensioned cable is expressed by the equation $$r_\alpha = R \cdot \left(1 - 0.5 \cdot \frac{\alpha}{270}\right)$$

where
- R=radius of the constant-radius pulley; the winding angle of the tensioned cable on the constant-radius pulley is substantially equal to 270°; the winding angle of the connecting cable on the variable-radius pulley is substantially equal to 270°; the preloading force $f_{270}$ of the contrast element, which corresponds to α=270°, is substantially equal to half of the maximum reaction force $f_0$, which corresponds to α=0°.

15. The device according to claim 10, comprising said at least one constant-radius pulley being two constant-radius pulleys which are coaxial and between which said variable-radius pulley is interposed, said tensioned cable being divided, at its end which is connected to said connecting means, into two cables which can be wound on said two constant-radius pulleys.

16. The device according to claim 10, wherein said pulleys are supported so that they can rotate about their common axis at the end of a supporting arm which is connected to said anchoring element.

17. The device according to claim 1, wherein said contrast element is constituted by a spring which elastically contrasts the rotation of said pulleys in the unwinding direction of said tensioned cable.

18. The device according to claim 17, characterized in that said spring is constituted by a helical spring.

* * * * *